(No Model.) 3 Sheets—Sheet 3.
J. T. DUFF.
MACHINE FOR MAKING PLOW COLTERS.
No. 499,454. Patented June 13, 1893.
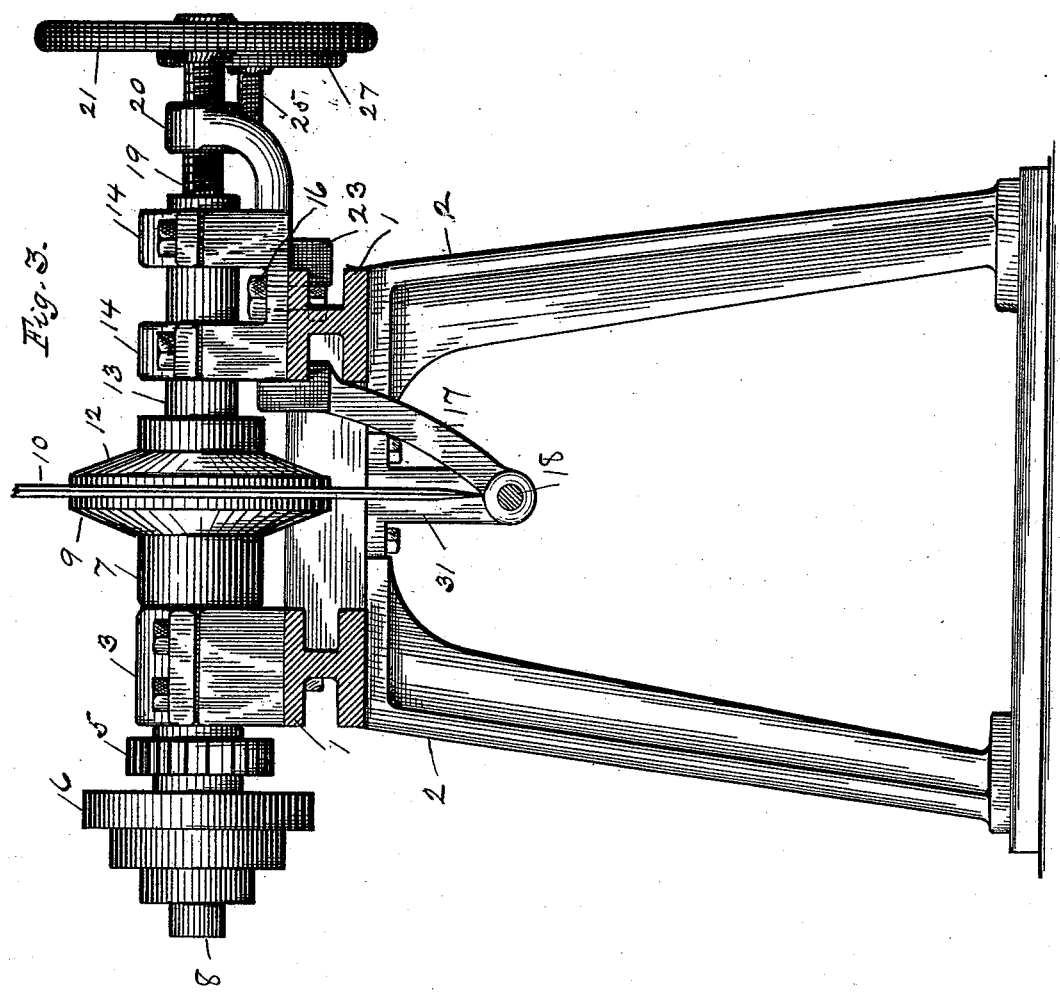
Witnesses:
Harry G. Eisenbeis
H. H. Harrison
Inventor.
John T. Duff

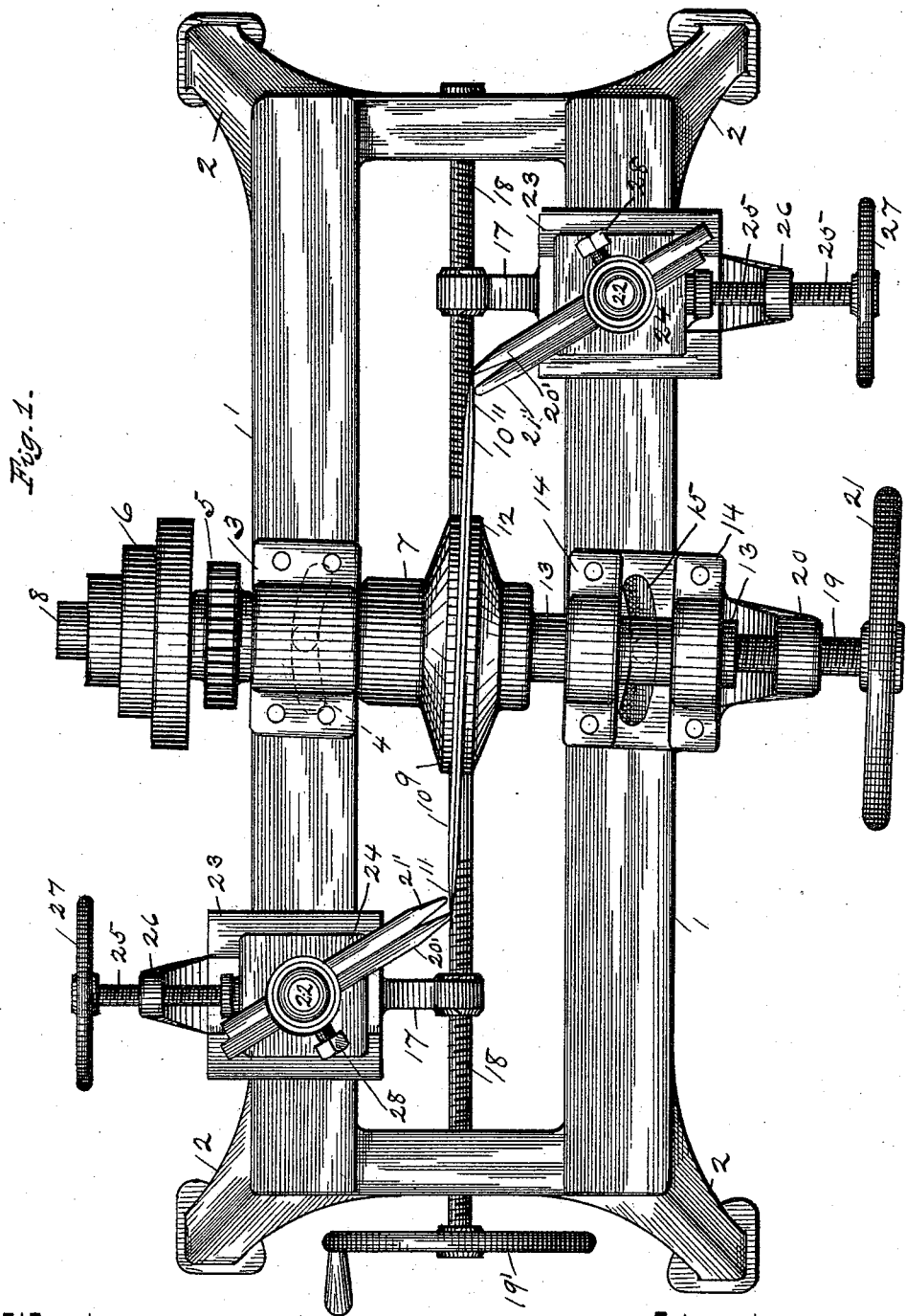

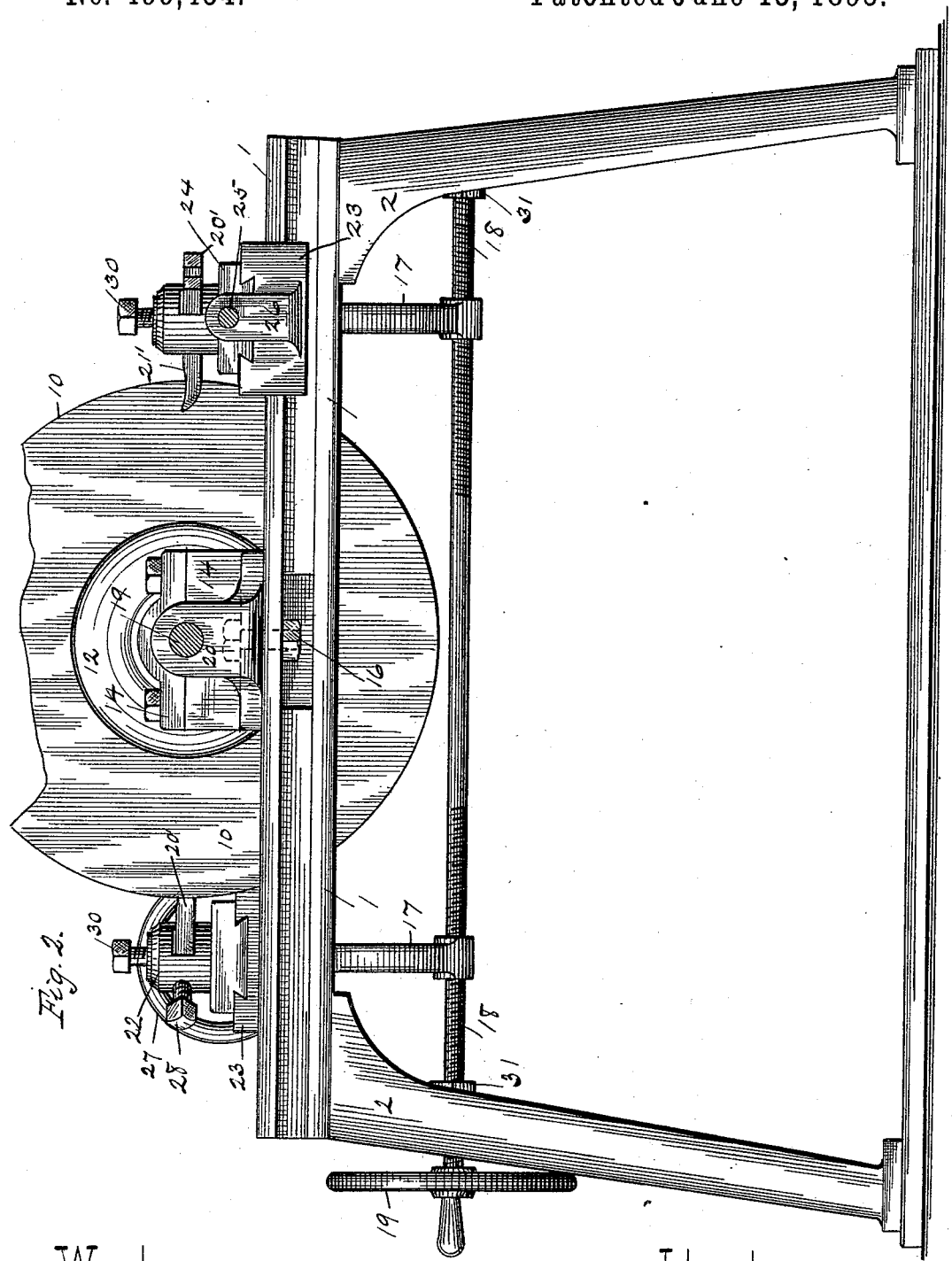

UNITED STATES PATENT OFFICE.

JOHN T. DUFF, OF PITTSBURG, PENNSYLVANIA.

MACHINE FOR MAKING PLOW-COLTERS.

SPECIFICATION forming part of Letters Patent No. 499,454, dated June 13, 1893.

Application filed July 28, 1892. Serial No. 441,534. (No model.)

*To all whom it may concern:*

Be it known that I, JOHN T. DUFF, a citizen of the United States, residing at Pittsburg, in the county of Allegheny and State of Pennsylvania, have invented certain new and useful Improvements in Machines for Manufacturing Plow and other Colters; and I do hereby declare the following to be a full, clear, and exact description of the invention, such as will enable others skilled in the art to which it pertains to make and use the same, reference being had to the accompanying drawings, which form a part of this specification.

My invention relates to an improved machine for manufacturing plow and other colters, and consists in certain details of construction and combination of parts as will be fully described hereinafter.

In the accompanying drawings Figure 1. is a plan view of my improved machine for cutting colters, which is constructed in accordance with my invention. Fig. 2. is a side elevation of the same partly in section. Fig. 3. is a sectional end elevation of the machine.

To construct a machine for cutting colters, I provide a frame 1 of a suitable size and form of construction, and mount the same on legs 2. Attached to the top of this frame 1. is a bearing 3. capable of being moved in the arc of a circle by being attached by a single bolt passing through a slot 4. formed through the bearing. Mounted in this bearing 3. is a shaft 8. to one end of which a disk 9 is attached, and provided at the other end with a toothed wheel 5. and cone pulley 6. to afford a means for rotating the said disk 9. Attached to the opposite side of the frame 1. is a similar bearing 14. to that above described, having a slot 15. and bearings for a shaft 13. This shaft 13. is provided with a disk 12 and arranged in a manner that will admit of its being moved in the direction of its length. This movement is accomplished by a threaded shaft 19. loosely connected to the main shaft 13. and passing through a threaded bearing 20. formed integral with the bearing 14. A hand wheel 21. attached to the threaded shaft 19, serves as a means for operating the same.

Attached on opposite sides of the frame 1. are two cutter heads 22. each of which is attached to a threaded shaft 18. by means of downwardly projecting arms 17. This shaft 18. is provided with a right and left hand screw thread, which when rotated by means of a hand wheel 19'. moves the cutter heads 22. toward or away from the disks 9 and 12. These cutter heads consist each of a sliding piece 23. capable of moving along the frame 1. and a transverse sliding piece 24 operated by a threaded shaft 25. loosely attached to said sliding piece 24. and passing through a bearing 26. This shaft 25 is provided with a hand wheel 27. for operating the same.

Mounted on the top of each of the pieces 24. is a tool holder provided with a set screw 28. for holding the tools 20'. and 21' therein. One of the tools 21'. in each of the holders is for the purpose of taking a rough cut, while the others following finish the work.

In operation the bearings 3 and 14 are arranged diagonally with the frame 1. and clamped or fixed in that position by the bolts 16. The disk 12. is moved away from the other by operating the hand wheel 21. A circular piece of metal is centered and held between the disks 9. 12. and clamped in that position by means of the hand wheel 21. The disks are now given a rotary movement, and the hand wheel 19. operated to move the tools 20' 21' to the work, the first tools 21' making a heavy cut at the beginning at each side which gradually runs out to nothing, while the finishing tools 20'. following after finish or smooth the taper or sharp edge formed on the metal, thereby forming a colter 10. as shown at Figs. 1. 2 and 3 on the drawings. The hand wheel 19. is now revolved in an opposite direction which moves the cutter heads back to their former position. The finished colter 10. is removed by separating the disks by operating the hand wheel 21.

Having thus described my invention, what I claim, and desire to secure by Letters Patent, is—

The herein described machine for making colters, consisting of a frame 1 having clamping disks mounted thereon, and means for canting and operating the same, a cutter head arranged at either side of the said disks, and operated toward or away from the same by a right and left handed screw shaft, suitable roughing and finishing tools secured in said heads, and means for adjusting the same toward or away from the work, all arranged and combined for service, substantially as described.

JOHN T. DUFF.

Witnesses:
 HARRY G. EISENBEIS,
 JOHN C. THOMPSON.